(No Model.) 2 Sheets—Sheet 1.
I. LEPLEY.
TIMBER FRAMING MACHINE.
No. 244,134. Patented July 12, 1881.
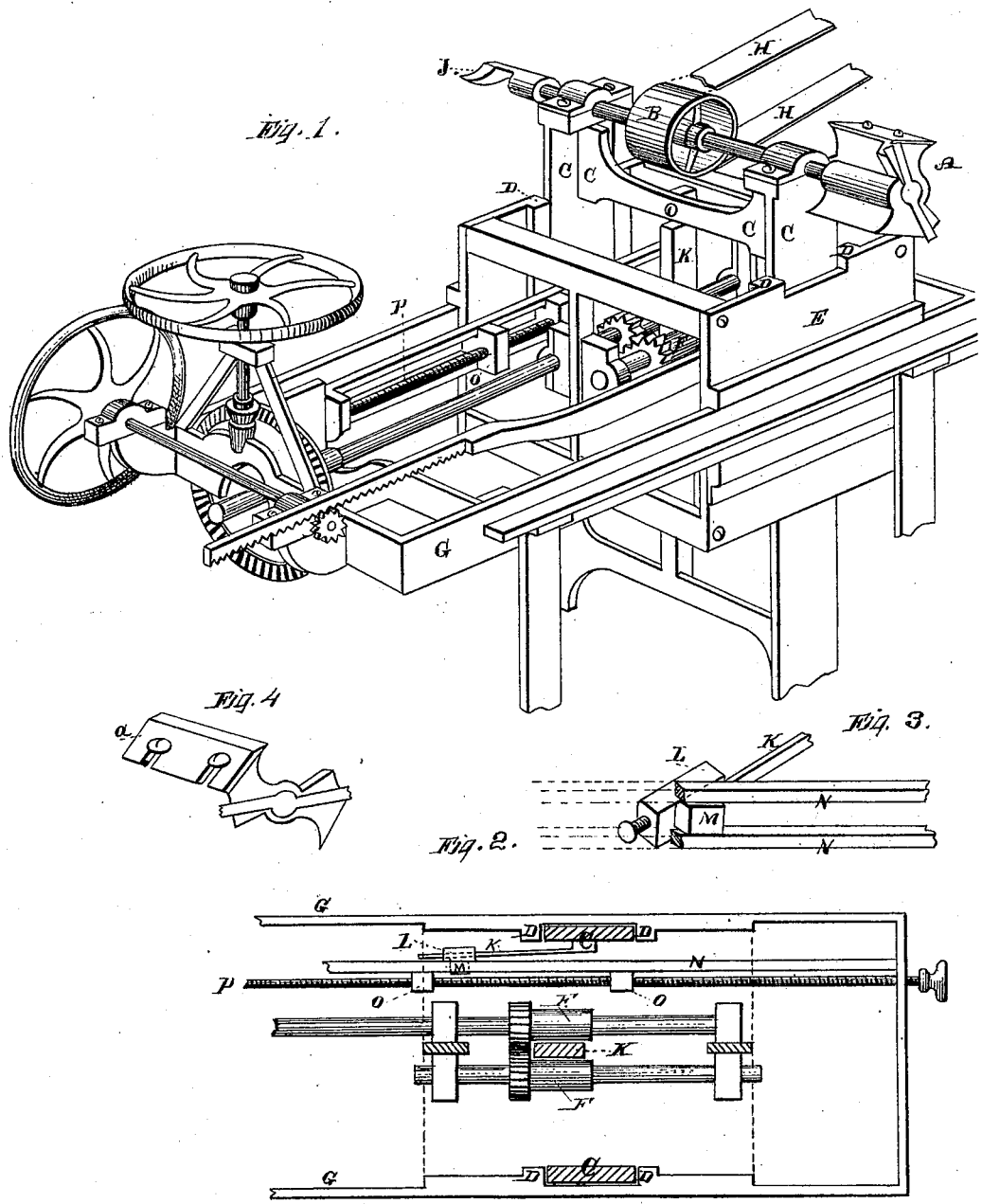
Witnesses
Geo. H. Strong.
Frank A. Brooks
Inventor
Isaac Lepley
By Dewey & Co.
Attys (No Model.) 2 Sheets—Sheet 2.
I. LEPLEY.
TIMBER FRAMING MACHINE.
No. 244,134. Patented July 12, 1881.
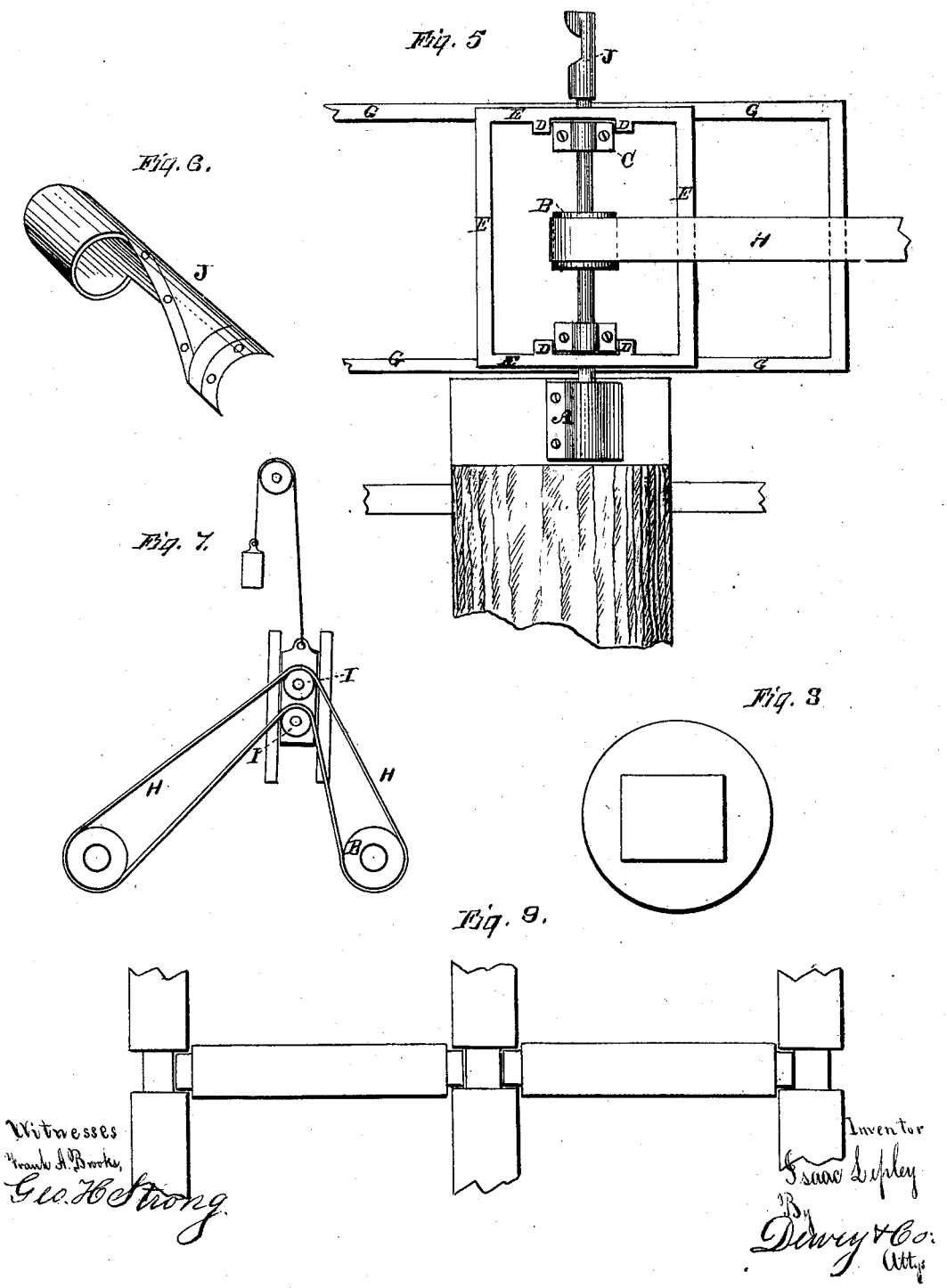

UNITED STATES PATENT OFFICE.

ISAAC LEPLEY, OF AMADOR CITY, CALIFORNIA.

TIMBER-FRAMING MACHINE.

SPECIFICATION forming part of Letters Patent No. 244,134, dated July 12, 1881.

Application filed December 30, 1880. (No model.)

*To all whom it may concern:*

Be it known that I, ISAAC LEPLEY, of the city and county of Amador, and State of California, have invented a Timber-Framing Machine; and I hereby declare the following to be a full, clear, and exact description thereof.

My invention relates to a novel mechanism which is intended for the framing of timbers of all kinds; and it consists in the employment of a cutter head or heads, which are caused to rotate upon a suitable frame, and this frame is moved both vertically and horizontally by means of slides and guides, so that the cutters may be carried across the timber upon either or all four sides to form a tenon, dovetail, or other cut; and, if desired, a round tenon may be formed by the use of a link which has one end fixed to the frame, so that the slides will move in a manner to carry the tool around in a circle.

Referring to the accompanying drawings for a more complete explanation of my invention, Figure 1 is a perspective view of my machine. Fig. 2 is a horizontal section. Fig. 3 shows the sliding block M. Fig. 4 is a view of the cutter-head. Fig. 5 shows manner of forming the tenon. Fig. 6 is a view of the boring-tool. Fig. 7 shows the belt-tightening device. Fig. 8 is an end view of log with tenon. Fig. 9 shows manner of framing.

A is the cutter-head, which is caused to rotate upon its shaft by a belt to the pulley B, so that the cutter acts as a planer. It may be of sufficient length for the tenon to be cut, or by moving the timber or carriage the length desired may be cut at two or more operations. Its shaft is journaled at the top of a frame, C. This frame is moved up and down in guides D upon the frame E by means of friction-rollers F, which press against a vertical central bar, K, which extends parallel with the frame C. These rollers are driven by pinions upon their shafts and a hand-wheel or other device upon a main shaft at the end of the machine, as shown. The frame E is also adapted to move horizontally upon the main frame G by means of similar gearing to that which moves the frame C, and by these two motions it will be seen that the cutters may be moved in any direction.

The log is laid upon a carriage with its end near the frame, as shown in Fig. 4, and its height is so adjusted that when the frame E is moved across horizontally the revolving cutters will be carried across, so as to make a cut to the depth desired. The frame C is then moved downward, and the cutters will cut the vertical face upon one side. The frame C then remains stationary, while the frame E is moved horizontally backward upon the guides on the main frame, and the cutters will complete the lower part of the tenon. The frame E is then held stationary, and the frame C is again moved upward, so that the cutters will be carried upward across the remaining side, and the tenon will be finished.

The cutters are blades secured to a head similar to those used upon planer-heads; but in order to make the vertical cut at the inner end of the tenon so that it will present a clean square surface, the sliding plates *a* are fitted to move in grooves in the end of the planer-head. Their outer ends are toothed or formed so as to make the proper cut, and they are secured in place, when adjusted, by set-screws or other device.

In order to allow the cutter-shaft and its driving-pulley to move in the directions and to the distances as hereinbefore described, the belt H, which drives it, is carried over the tightening-pulleys I, and passes thence to the main driving-pulley, which is situated at one side. The tightening-pulleys have their shafts journaled in a sliding frame which has a counter-weight, so that while the frame may be drawn down or to one side, to adapt the belt to all the movements of the cutter-head, the weight will immediately return it again when relieved, and thus the belt will be kept perfectly tight.

The tenons here described are those which are usually made upon the ends of the timbers used in timbering up mines. These timbers are united, as shown in Fig. 5, and these tenons allow the timbers to be properly set together. It will be obvious, however, that this apparatus may be employed to make any kind of a cut on a timber, or to square up the ends of timbers, as the cutter may be moved in any direction required.

Upon the end of the cutter-shaft opposite the planer-head is a peculiar-shaped cutting and boring tool, J, which is intended to form mortises either in the sides or ends of timbers. The end of this tool is nearly flat, but is provided with a cutting-bit, which enables it to enter the timber as far as may be desired.

The sides of the tool (which is cylindrical in shape) are cut away so as to form an inclined cutting-edge, and after it has entered the timber far enough to give the required depth the frame E may be moved upon the frame G, when the side cutters will cut away the wood until the mortise is as long as desired. The same style of cutter may be employed to form what is termed the "boxing," or the depression which is cut across the timber, equal to the length of the mortise to receive the foot of the timber, which is tenoned to fit the mortise. The tenon to fit this mortise is formed by the cutter A in the same manner as has been described, except that the ends must be rounded to fit the ends of the mortise, which may be left curved by the tool J. In order to make these rounded ends to the tenon, it is necessary to produce a compound motion of the two frames C and E, one of which, as before described, moves vertically, while the other moves horizontally. This compound motion is produced by the aid of an arm, K, which has one end pivoted to the side of the vertically-moving frame C. The opposite end is adapted to slip into a slot in a block, L, which is pivoted to a slide, M, this slide moving in a slot in the bar N, which extends from end to end of the frame G and inside the frames E and C. Two stops, O, are fitted to be moved to or from each other by the long right-and-left screw P, these stops having projections which enter the slot in the bar N, and they serve to limit the motion of the slide M and block L.

When a tenon is to be made with rounded ends the bar or arm K is slipped through the slot in the block L, and is secured by a set-screw, as shown. This arm is secured at a distance from the pivot about which the arm turns equal to half the thickness of the proposed tenon added to the whole diameter of the cutter-head, as the latter must pass all around the tenon.

The stops O are adjusted by turning the screw P until they are at a distance apart equal to the width of the tenon to be made plus the diameter of the cutter-head.

The operation will then be as follows: The frame C being set at a point which will allow the cutter to form the top of the tenon, the frame E is moved horizontally upon the main frame G until the slide M has moved the distance between the stops O. This carries the cutter across the top of the tenon to the point where the curve of one side or edge commences. From this point the frame C is moved downward and the frame E horizontally, the arm K acting as the radius or link to hold the frames in their relative position and the cutter to its work until it has passed around the side and formed the curve at that part of the tenon. The arm K having then passed around its pivot to form a half-circle, the frame C is allowed to remain stationary and the frame E is moved along to allow the cutter to form the bottom of the tenon, the block M moving the distance between the stops O. From this point the curve at the opposite side of the tenon is formed in the same manner as before described.

If it is desired to form a complete cylindrical tenon, the stops O are moved up close to the slide M, the block L having been secured to the arm K at a distance from the center or pivot equal to half the diameter of the proposed tenon plus the diameter of the cutter, and the frames C and E are then moved simultaneously, so as to produce a compound movement, the result of which will be to form a cylindrical tenon.

This machine is applicable to work upon any form of timbers and make any kind of a cut.

The tool J may be made with cutters which can be detached to be sharpened or renewed.

Having thus described my invention, what I claim as new, and desire to secure by Letters Patent, is—

1. The stationary frame G, having the horizontal guides or ways supporting the frame E, which is moved upon them by a rack and pinion, as shown, the frame E, having the horizontal friction-rollers F, in combination with the frame C, supporting the cutter-shaft moving vertically in guides or ways within the frame E, and having the central bar, K, extending between the friction-rollers, substantially as and for the purpose herein described.

2. The fixed slotted bar N, extending from end to end of the frame G, and within the horizontally-moving frame E and the vertically-moving frame C, and having the stops O, with an adjusting right-and-left screw, P, in combination with the slide M, having the block L pivoted to it, and the arm K, having one end pivoted to the frame C and the other adjustably secured to the block L, substantially as and for the purpose herein described.

In witness whereof I have hereunto set my hand.

ISAAC LEPLEY.

Witnesses:
S. H. NOURSE,
FRANK A. BROOKS.